(12) United States Patent
Pessolano

(10) Patent No.: US 7,765,533 B2
(45) Date of Patent: Jul. 27, 2010

(54) AUTOMATIC TASK DISTRIBUTION IN SCALABLE PROCESSORS

(75) Inventor: Francesco Pessolano, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1642 days.

(21) Appl. No.: 10/511,514

(22) PCT Filed: Apr. 4, 2003

(86) PCT No.: PCT/IB03/01399

§ 371 (c)(1),
(2), (4) Date: Oct. 14, 2004

(87) PCT Pub. No.: WO03/091874

PCT Pub. Date: Nov. 6, 2003

(65) Prior Publication Data

US 2005/0132345 A1   Jun. 16, 2005

(30) Foreign Application Priority Data

Apr. 25, 2002   (EP) .................................. 02076642

(51) Int. Cl.
*G06F 9/45* (2006.01)
(52) U.S. Cl. ...................... 717/154; 717/151; 717/153; 717/159

(58) Field of Classification Search .......... 717/151–161
See application file for complete search history.

(56) References Cited

U.S. PATENT DOCUMENTS

| | | | | |
|---|---|---|---|---|
| 5,497,373 | A * | 3/1996 | Hulen et al. | 370/259 |
| 5,696,956 | A * | 12/1997 | Razdan et al. | 712/23 |
| 5,752,035 | A * | 5/1998 | Trimberger | 717/153 |
| 5,966,534 | A * | 10/1999 | Cooke et al. | 717/155 |
| 6,044,225 | A * | 3/2000 | Spencer et al. | 710/52 |
| 6,077,315 | A * | 6/2000 | Greenbaum et al. | 717/157 |
| 6,327,704 | B1 * | 12/2001 | Mattson et al. | 717/153 |
| 6,912,706 | B1 * | 6/2005 | Stamm et al. | 716/17 |
| 2002/0029357 | A1 | 3/2002 | Charnell | |

* cited by examiner

*Primary Examiner*—Jason Mitchell

(57) ABSTRACT

A processing method and apparatus for processing an information is based on a sequence of instructions, where a repeated sub-sequence is detected in the sequence of instructions and an allocation between a processing resource and the repeated sub-sequence is determined based on an index information indicating the repetition frequency of the repeated sub-sequence. Thus, a combination of a scalable signal processor with automatic task distribution is provided, where the number of memory accesses can be reduced, as the repeated sub-sequence can be allocated to external processing units, which are correspondingly programmed or which use their embedded memory.

19 Claims, 4 Drawing Sheets

AUTOMATIC TASK DISTRIBUTION IN SCALABLE PROCESSORS

The present invention relates to a method and apparatus for processing an information based on a sequence of instructions, especially to a method of scheduling processing resources in a scalable digital signal processor.

Digital signal processors (DSPs) are designed to execute tasks with hard real-time constraints. Therefore, emphasis is directed on computing power. There are several factors which determine the computing power. Probably, the most obvious factor is clock frequency, but this is certainly not the only factor. Other important factors are the expressive power of an operation (i.e. the instruction set), the number of clock cycles necessary to execute an operation, the number of operations that can be executed in parallel, the amount of pipelining between consecutive operations, the penalty in terms of wasted clock cycles when branches are executed, etc.

In DSP processors the basic concept to boost performance is exploiting instruction level parallelism. In the present application, it will be referred to an instruction as the complete piece of programme information which is supplied to a processor core in a single clock cycle. Thus, a single instruction can imply the execution of several operations in parallel in the same clock cycle. To allow the concurrent execution of operations in a processor, three architectural measures can be taken in the hardware. These are overlapped execution, functional unit pipelining, and multiple functional units. Overlapped execution means that the processor is working on multiple instructions simultaneously, that is, multiple instructions are active, each in a different phase of fetch, decode, and execute.

To exploit instruction level parallelism, the dependency between operations must be determined. Taking these dependencies into account, the operations must be scheduled at some particular time on some particular functional unit, and registers into which the results can be deposited must be assigned. Exploiting instruction level parallelism is a task of either the programmer, the compiler, or the runtime hardware. Depending on the architectural approach which is taken, emphasis is on one of the three approaches.

In traditional DSPs, instructions are executed in sequences with a capability of jumping from one position in the sequence to another, depending on the current state. This capability leads to a situation where a given application is composed of instructions executed once and instructions or short sequences of them executed more than once. If an application is monitored during its execution on a given DSP, a profile can be generated, where different parts of the application are given a different repetition index $r_i$.

FIG. 1 shows a schematic diagram in which a sequence of instructions is indicated by a sequence of horizontal bars, each bar corresponding to a single instruction. Furthermore, those instructions included within a dotted frame form repeated sub-sequences of instructions. The repetition index $r_i$ indicated at each repeated sub-sequence represents the repetition rate, wherein the index $r_i=0$ corresponds to the most frequently executed sub-sequence and no index means that the instruction is executed only once. Thus, in the sequence of instructions shown in FIG. 1, the repeated sub-sequence indicated in the middle part is the sub-sequence which is most frequently executed, the upper repeated sub-sequence is the second most frequently executed sub-sequence, and the lower repeated sub-sequence is the third most frequently executed sub-sequence.

However, if such a sequence of instructions is executed by a single processor core of a DSP, the instruction memory is accessed several times for fetching the same sub-sequence which delays processing and reduces performance.

Document U.S. Pat. No. 5,796,989 discloses a system for optimising the execution of instructions undertaken by a processor. In particular, instruction code sequences are reorganised, so that the native code used to emulate instructions which occur most frequently are grouped together. As a result, when the native code for a frequently occurring emulated instruction is loaded from the memory into the cache, the likelihood that the cache will contain the native code for subsequent emulated instructions is maximised. Thus, most frequently received instructions are stored in an easily accessible manner, reducing processing latency.

It is an object of the present invention to provide a method and apparatus for processing an information based on a sequence of instructions, by means of which the processing efficiency can be further improved.

This object is achieved by a method as claimed in claim 1, an apparatus as claimed in claim 12, and a compiler as claimed in claim 18.

Accordingly, due to the fact that the repetition rate of the repeated sub-sequences is identified, resources consuming high repetition sequences can be deferred to external processing units, while the remaining sequences with low repetition rate are executed in the conventional manner by the core processor. Thereby, the performance can be improved by adding external processing resources. Furthermore, a flexible processing system can be provided, due to the fact that the kind and number of external processing units may individually be selected. As the most repetitive sub-sequences are outsourced to the external processing units, accesses to the instruction memory are reduced to thereby reduce system power requirements.

If a signalling function is provided, by means of which external processing units may signal their availability to the processor core, a plug'n'play operating mode can be established, where the external processing units may be selectively added and automatically considered in the task distribution. Due to the execution overlap between the different external resources and the self-expandable processor itself (core processor), an increased performance can be provided, while a minimum performance, corresponding to the performance of the core processor as such, is always guaranteed. Due to the flexibility of the arrangement, compatibility with current and foreseeable DSP generations can be assured.

Advantageous further developments of the present invention are defined in the dependent claims.

Preferably, an instruction containing the index information may be generated and added to the sequence of instructions. The index information may comprise an integer number set in proportion with a ranking of the repetition rate of the repeated sub-sequence compared to the repetition rate of other detected repeated sub-sequences. In particular, the allocation may be determined by comparing the integer number with the number of available sources. Then, all repeated sub-sequences for which the integer number is smaller than the number of available processing resources are allocated to a selected processing resource.

Furthermore, the index information may comprise an information indicating the number of instructions in the repeated sequence.

If the repeated sub-sequence is no longer detected for a predetermined time period, an instruction is generated for deleting the repeated sub-sequence, and a processing unit to which the deleted repeated sub-sequence was allocated is reset.

Additionally, an instruction may be generated for specifying processing registers used by the repeated sub-sequence, wherein the instruction is used for locking the specified processing registers.

A processing resource may be activated when the instruction containing the index information indicates that the corresponding repeated sub-sequence has already been allocated to the processing resource. In this case, the activating step may comprise the step of programming other processing source according to the corresponding repeated sub-sequence, or uploading the corresponding repeated sub-sequence to a memory of the processing resource.

The presence of external processing units may be signalled to a central processing unit, and the number of available external processing units may be counted based on the signalling.

In the processing apparatus, connecting means may be provided for connecting at least one external processing unit to which the repeated sub-sequence can be allocated. Furthermore, a memory table may be provided for storing an allocation information indicating allocation between the at least one external processing unit and corresponding repeated sub-sequences. The external processing units may comprise processing cores and/or configurable logic blocks.

Additionally, mapping means may be provided for mapping the repeated sub-sequence to an available one of the at least one external processing unit based on the index information.

The compiler may be arranged to add to the repeated sub-sequence an instruction specifying the index information. The additional instruction may be added so as to precede the repeated sub-sequence.

Furthermore, the compiler may be arranged to add the instruction indicating that the repeated sub-sequence is not used anymore and/or the instruction for specifying the processing registers used by the repeated sub-sequence. Furthermore, the compiler may be arranged to determine the ranking of the repeated sub-sequences based on their repetition rate.

In the following, the present invention will be described in greater detail on the basis of a preferred embodiment with reference to the accompanying drawings in which.

Figure 2:
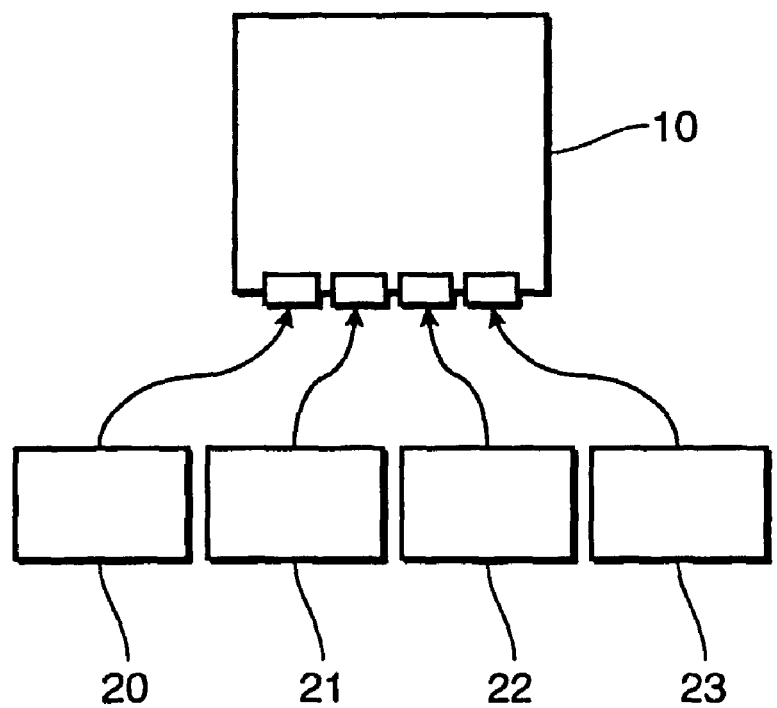
FIG. 2 shows a simplified diagram of a self-expandable digital signal processor, in which the present invention can be implemented.

The preferred embodiment will now be described on the basis of a self-expandable DSP (Se-DSP) as indicated in FIG. 2.

According to FIG. 2, the Se-DSP 10 comprises a plurality of ports to which processing resources 20 to 23 can be connected. In this context, a resource is either a re-configurable core or a small processing core with embedded memory. Due to this configuration, the Se-DSP 10 is allowed to run an application in its optimal form depending on the processing resources 20 to 23 available at the time up to a maximum limit of resources. In the case of FIG. 2, up to four additional processing resources or units can be connected or attached, which may be configurable logic blocks, i.e. Field Programmable Gate Arrays (FPGAs) or processor cores provided with their own memory.

Figure 1:
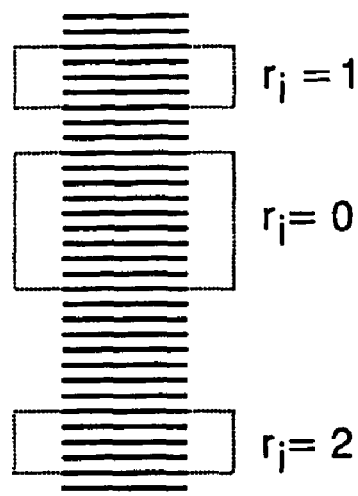
FIG. 1 shows a schematic, diagram of a sequence of instructions comprising repeated sub-sequences.
Figure 3:
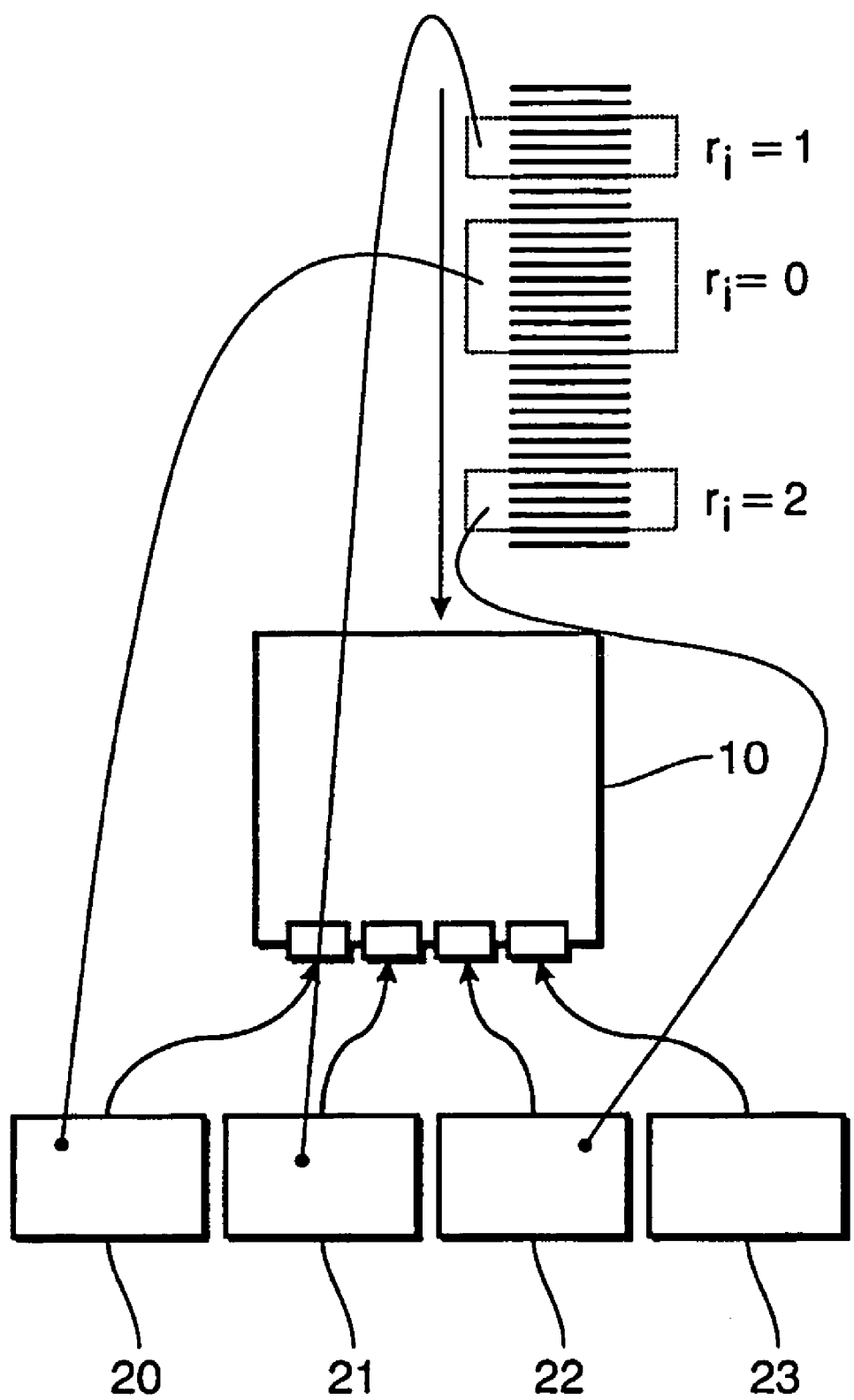
FIG. 3 shows a simplified block diagram indicating a mapping of repeated sub-sequences into available external processing units, according to the preferred embodiment of the present invention.

FIG. 3 shows a simplified diagram of a mapping function for mapping the repeated sequences of FIG. 1 to the available processing resources or units (Co-units) in the Se-DSP 10. According to the preferred embodiment, a mechanism is provided by which the Se-DSP 10 can map the repeated or repetitive sequences with higher repetition rate on the available additional processing units 20 to 23. Thereby, as soon as such a repeated sub-sequence is detected in the Se-DSP 10, the corresponding processing is handed over or allocated to a predetermined one of the processing units 20 to 23, such that the Se-DSP 10 may continue processing based on the subsequent instruction following the allocated repeated sub-sequence. Thereby, repeated sub-sequences can be processed concurrently, while the Se-DSP 10 continues processing of the remaining less repetitive instructions or sub-sequences.

Figure 4:
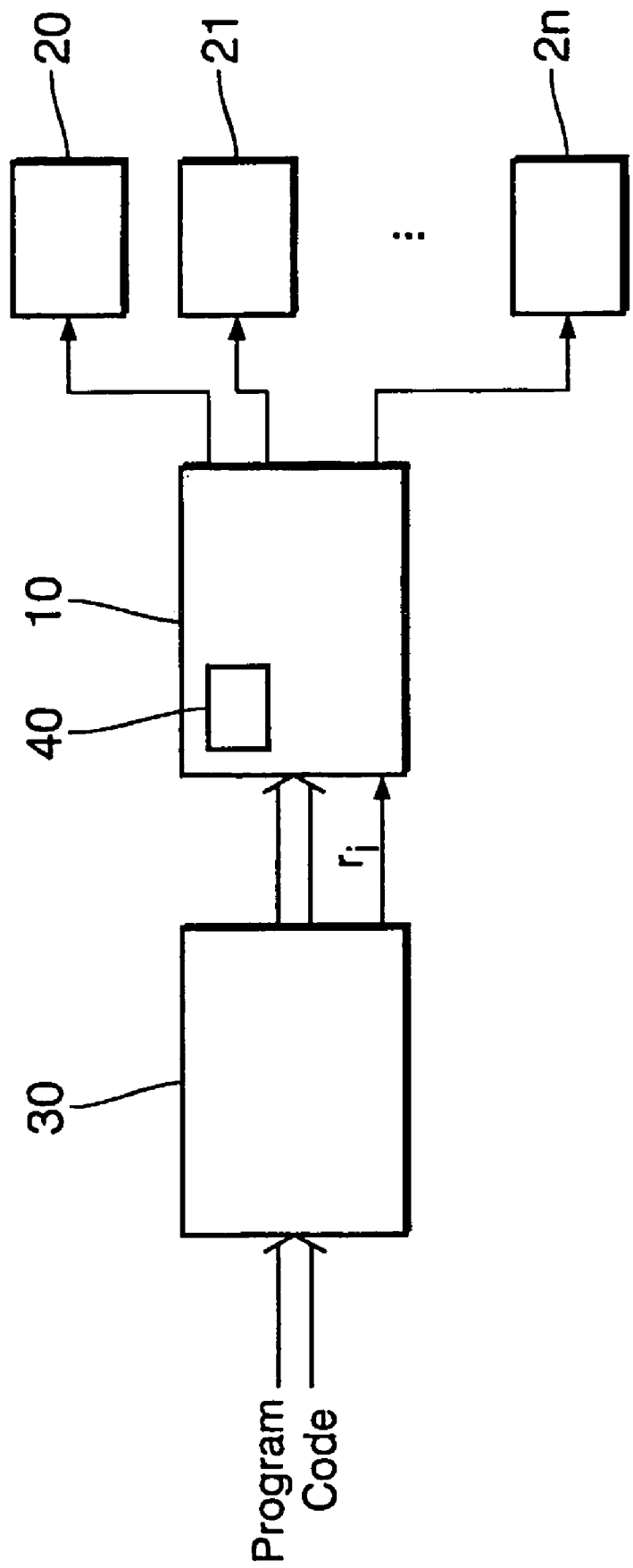
FIG. 4 shows a schematic diagram of a processing apparatus according to the preferred embodiment.

FIG. 4 shows a schematic block diagram of the processing in the Se-DSP 10, wherein an original programme code is compiled in a compiler 30. The compiler is arranged to identify repeated sequences of instructions, i.e. loops or function calls, and to determine at compiling time a ranking of these sequences or sub-sequences based on their repetition rate. The signalling of the repeated sub-sequences may be based on at least one additional instruction by means of which an information about the repeated sub-sequences can be notified to the Se-DSP 10 at execution time.

Furthermore, a mechanism is provided, by which the Se-DSP 10 can determine how many additional external processing units 20 to 2n are attached. Furthermore, another mechanism is provided by which the Se-DSP 10 can map the detected repeated sub-sequences with higher repetition rate on the available processing units 20 to 2n.

To achieve this, the Se-DSP 10 is provided with an additional instruction, e.g. called rep_index and an internal memory or table 40. The additional instruction is used by the compiler 30 to delimit a repetitive sequence of instruction. It provides the number of instructions in the sequence and the repetition index $r_i$. According to the preferred embodiment, the repetition index $r_i$ is a number greater or equal to zero, with zero being the index for the sub-sequence with the highest repetition rate. Therefore, if a number $n_r$ of additional resources is attached, all sub-sequences with repetition index $r_i$ less than $n_r$ can be mapped to the additional resources, e.g. the processing units 20 to 2n.

The internal memory or table 40 is used to store information about the repeated sub-sequences. The table may have one entry per possible processing unit. Every time a repeated sub-sequence is mapped onto an additional processing unit, a corresponding entry is set, i.e. the port name of the respective processing unit is written into the table 40. The table 40 is indexed by the repetition index $r_i$.

Accordingly, a generic DSP is allowed to run an application in its optimal form depending on the available processing resources. The generic DSP architecture is extended by a number of ports to which processing resources can be connected, wherein a processing resource corresponds either to a configurable core or a small processing core with embedded memory, or a programmable logic unit. Furthermore, the internal table 40 and at least one additional instruction is required to specify a sequence of instructions executed more than once and its repetition index. From the software side, the compiler is arranged to generate the repetition indexes $r_i$. The generation of the repetition index $r_i$ may be based on the generation of similar statistics as performed in modern VLIW (Very Large Instructional Word) compilers.

Thus, according to the preferred embodiment, repeated sequences of instructions with higher repetition rate are deferred to the available connected processing resources and the remaining instruction code is executed in a conventional manner by the DSP.

According to the preferred embodiment, two additional instructions may be added. A first discard instruction may be used to inform the Se-DSP 10 to delete a repeated sub-sequence with a repetition index $r_i$ specified by the instruction itself. In this case, the processing unit on which this repeated subsequene was mapped is reset, which means that it is put into its initial or reset state. Then, a repeated sub-sequence with lower repetition rate, i.e. higher repetition index $r_i$, can be mapped on this reset processing unit.

Furthermore, a second mask instruction can be used to specify internal registers of the Se-DSP 10, which will be used by the respective repeated sub-sequence. This mask instruction follows the repetition index instruction. By this mask instruction, the specified registers are effectively locked, i.e. their use is not allowed until the corresponding repeated sub-sequence has been completed. In this way, the execution of a repeated sub-sequence will not stall the Se-DSP 10 until the moment when the application tries to access one of the specified registers. Thus, the register locking provides the advantage that the execution of the repeated sub-sequences does not stall or lock the remaining processing resources. Thereby, concurrent execution of repeated and non-repeated instructions is possible. Once a repeated sub-sequence is mapped and stored in the internal table 40 of the Se-DSP 10, it will not be fetched again by the Se-DSP 10. In fact, when the repetition index instruction for a mapped sub-sequence which is already stored or registered in the internal table 40 is detected, a branch operation is initiated and the mapped processing unit is activated. Hence, access to the instruction memory (not shown in FIG. 4) is reduced.

The number of available additional processing units 20 to 2n is determined by the Se-DSP 10 e.g. right after a reset operation. For example, each external processing unit 20 to 2n may signal its presence by means of a simple signal, e.g. a 1-bit signal, and the Se-DSP 10 may simply count the signals received from the additional processing units 20 to 2n. If no additional unit is present, the Se-DSP 10 behaves as a conventional DSP.

The mapping of the repeated sub-sequences to the processing units 20 to 2n depends on the nature or kind of the respective processing unit. In case of a FPGA, mapping may be performed by correspondingly programming the FPGA. In case of processing cores provided with a memory, mapping may be performed by uploading the repeated sub-sequence to the memory of the processing core. The processing units 20 to 2n have access to the register file of the Se-DSP 10 in any conventional manner. They may be arranged on the same integrated circuit as the Se-DSP 10 or may be provided on an external circuit.

Figure 5:
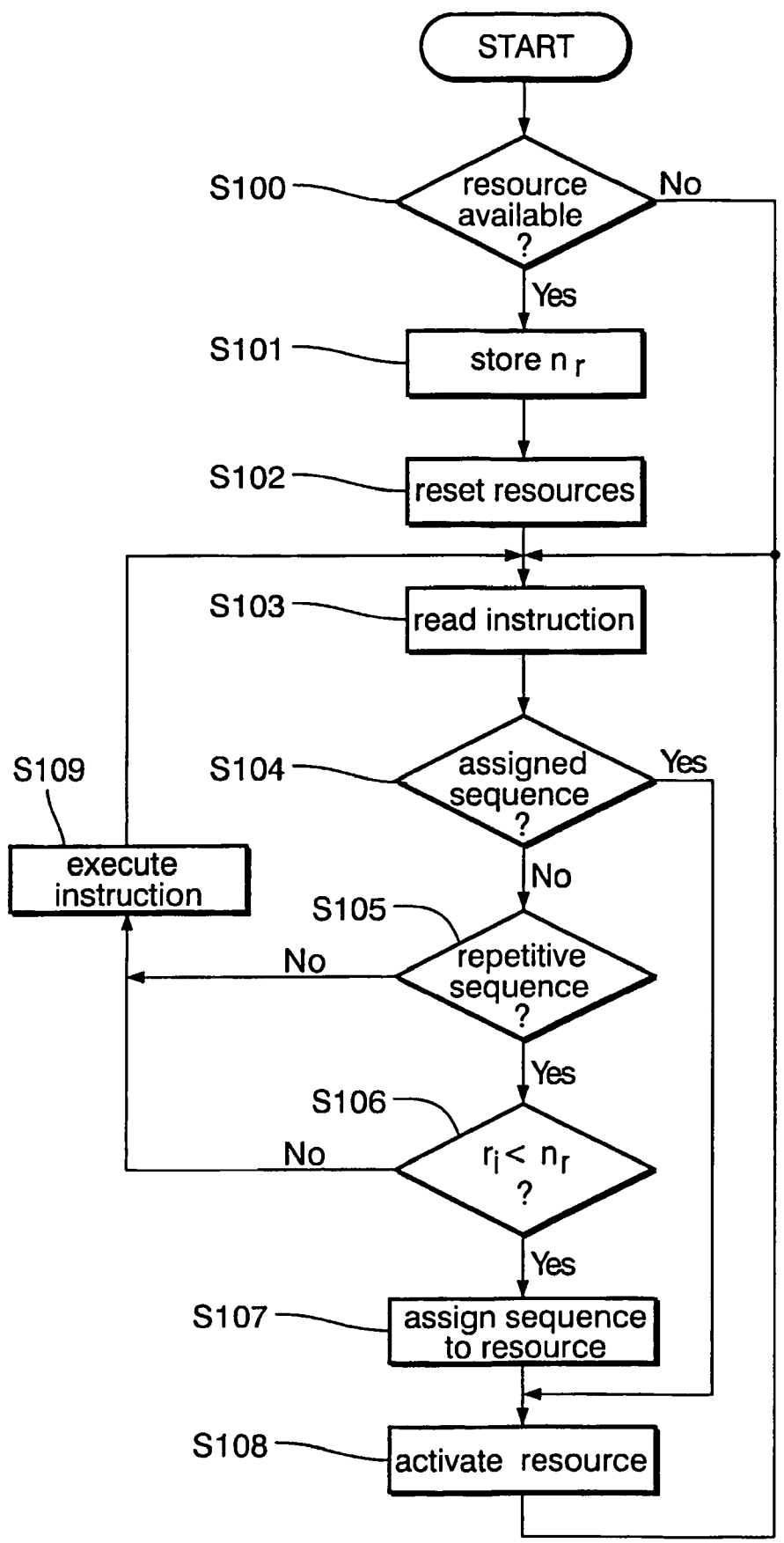
FIG. 5 shows a flow diagram of a processing method according to the preferred embodiment.

FIG. 5 shows a schematic flow diagram indicating a processing operation of the Se-DSP 10.

In a first step S100, the core of the Se-DSP 10 detects whether any external resource, e.g. additional processing unit 20 to 2n, is available. This may be achieved by counting the corresponding notification signals received from the external processing resources. If resources are available, the number $n_r$ of the external processing units 20 to 2n is stored in the internal table 40 in step S101, and the external processing units 20 to 2n are put into their reset state in step S102. Then, the application is started and the first instruction is read from the instruction memory in step S103. If no external processing resource is detected in step S100, the Se-DSP 10 behaves as a conventional DSP without any matching function for repeated sub-sequences.

In step S104, it is checked whether the read instruction indicates an assigned sequence already stored in the internal table 40. If so, the corresponding processing resource, e.g. processing unit, is activated in step S108 and the procedure returns to step 103 to read the subsequent instruction. If the read instruction does not indicate an assigned sequence in step S104, it is checked whether the read instruction indicates a repetitive or repeated sub-sequence in step S105. If so, it is checked in step S106 whether the repetition index $r_i$ indicated by the corresponding repetition index instruction is smaller than the number $n_r$ of the available processing resources 21 to 2n. If so, the respective repeated sub-sequence is assigned to an available processing resource in step S107 and the selected processing resource is activated in step S108. Furthermore, a corresponding entry is added to the internal table 40 specifying the selected processing resource. The assignment in step S107 may be effected by storing the repeated sub-sequence in the internal memory of the processing resource or using the repeated sub-sequence to configure the processing resource. If the read instruction does not indicate any repeated sub-sequence or the repetition index $r_i$ is not smaller than the number of available processing resources, the procedure precedes to step S109, where the read instruction is executed in the Se-DSP 10 in a conventional manner. Then the flow returns to step S103 in order to read the subsequent instruction. The core of the Se-DSP 10 starts executing a subsequent instruction following a repeated or assigned sub-sequence until the result or results of such a sub-sequence is required for the subsequent instruction.

Thus, sub-sequences or tasks can be flexibly assigned to external processing units, e.g. co-processors available to the Se-DSP 10. Thereby memory access to the instruction memory can be reduced as the external processing units used their embedded memory or are correspondingly programmed. This also saves power.

It is to be noted that the present invention is not restricted to the preferred embodiment described above, but can be used in any scalable data processing architecture in which an information is processed based on a sequence of instructions. The preferred embodiment may thus vary within the scope of the attached claims.

The invention claimed is:

1. A method for processing an information based on a sequence of instructions in an apparatus for data processing comprising a processor, said method comprising the acts of:
    detecting a repeated sub-sequence in said sequence of instructions by the apparatus for data processing;
    determining a number of external processing units connected to ports of the apparatus, the external processing units being external to the apparatus;
    providing an index information indicating a repetition rate of said repeated sub-sequence, wherein said index information comprises an integer number set in proportion with a ranking of the repetition rate of said repeated sub-sequence compared to the repetition rate of other detected repeated sub-sequences; and
    determining an allocation between the external processing units and said repeated sub-sequence based on said index information;
    wherein said allocation is determined by comparing said integer number with the number of the external processing units, and wherein all repeated sub-sequences for which said integer number is smaller than said number of the external processing units are allocated to a selected processing unit.

2. The method of claim 1, including generating an instruction containing said index information, and adding said instruction to said sequence of instructions.

3. The method of claim 2, including activating an external processing unit of the external processing units when said instruction containing said index information indicates that the corresponding repeated sub-sequence has already been allocated to said external processing unit.

4. The method of claim 3, wherein said activating comprises programming said external processing unit according to said corresponding repeated sub-sequence, or uploading said corresponding repeated sub-sequence to a memory of said external processing unit.

5. The method of claim 1, wherein said index information comprises an information indicating the number of instructions in said repeated sub-sequence.

6. The method of claim 1, including generating an instruction for deleting said repeated sub-sequence, if said repeated sub-sequence is no longer detected for a predetermined time period, and resetting a processing unit to which said deleted repeated sub-sequence was allocated.

7. The method of claim 1, including generating an instruction for specifying processing registers used by said repeated sub-sequence, and using said instruction for locking said specified processing registers.

8. The method of claim 1, including signalling presence of the external processing units to a central processing unit, and counting the number of available external processing units based on said signalling.

9. An apparatus for processing an information based on a sequence of instructions, said apparatus comprising a processor configured to:
  detect a repeated sub-sequence in said sequence of instructions, and for providing an index information indicating a repetition rate of said repeated sub-sequence, wherein said index information comprises an integer number set in proportion with a ranking of the repetition rate of said repeated sub-sequence compared to the repetition rate of other detected repeated sub-sequences;
  determine a number of external processing units connected to ports of the apparatus, the external processing units being external to the apparatus; and
  allocate said repeated sub-sequence to a processing unit based on said index information by comparing said integer number with the number of the external processing units;
  wherein all repeated sub-sequences for which said integer number is smaller than the number of the external processing units are allocated to a selected processing unit.

10. The apparatus of claim 9, further comprising a memory table for storing an allocation information indicating an allocation between said external processing units and corresponding repeated sub-sequences.

11. The apparatus of claim 9, wherein said apparatus is a digital signal processor and said external processing units are processor cores and/or configurable logic blocks.

12. A compiler stored on a computer readable medium, the compiler for providing an output sequence of instructions to be used for processing an information in an apparatus for data processing, said compiler being arranged to:
  detect a repeated sub-sequence in said output sequence of instructions;
  provide an index information indicating a repetition rate of said repeated sub-sequence, wherein said index information comprises an integer number set in proportion with a ranking of the repetition rate of said repeated sub-sequence compared to the repetition rate of other detected repeated sub-sequences;
  determine a number of external processing units connected to ports of the apparatus, the external processing units being external to the apparatus; and
  allocate said repeated sub-sequence to a processing unit based on said index information by comparing said integer number with the number of the external processing units;
  wherein all repeated sub-sequences for which said integer number is smaller than the number of the external processing units are allocated to a selected processing unit.

13. The compiler of claim 12, wherein said compiler is arranged to add to said output sequence an instruction for allocating at least one processing register until said repeated sub-sequence is finished.

14. The compiler of claim 12, wherein said compiler is arranged to determine the ranking of repeated sub-sequences based on their repetition rate.

15. A compiler stored on a computer readable medium, the compiler for providing an output sequence of instructions to be used for processing an information in an apparatus for data processing, said compiler being arranged to:
  detect a repeated sub-sequence in said output sequence of instructions and to provide an index information indicating a repetition frequency of said repeated sub-sequence;
  determine a number of external processing units connected to ports of the apparatus, the external processing units being external to the apparatus;
  allocate said repeated sub-sequence to a processing unit based on said index information by comparing said integer number with the number of the external processing units;
  wherein all repeated sub-sequences for which said integer number is smaller than the number of the external processing units are allocated to a selected processing unit; and
  add to said repeated sub-sequence an additional instruction specifying said index information.

16. The compiler of claim 15, wherein said additional instruction is added so as to precede said repeated sub-sequence.

17. The compiler of claim 15, wherein said compiler is arranged to allocate said repeated sub-sequence to a separate processing unit.

18. The compiler of claim 15, wherein said compiler is arranged to add an additional instruction to said repeated sub-sequence for use in processing notification at execution time.

19. A compiler stored on a computer readable medium, the compiler for providing an output sequence of instructions to be used for processing an information in an apparatus for data processing, said compiler being arranged to:
  detect a repeated sub-sequence in said output sequence of instructions;
  provide an index information indicating a repetition frequency of said repeated sub-sequence, wherein said index information comprises an integer number set in proportion with a ranking of the repetition rate of said repeated sub-sequence compared to the repetition rate of other detected repeated sub-sequences;

determine a number of external processing units connected to ports of the apparatus, the external processing units being external to the apparatus;

allocate said repeated sub-sequence to a processing unit based on said index information by comparing said integer number with the number of the external processing units;

wherein all repeated sub-sequences for which said integer number is smaller than the number of the external processing units are allocated to a selected processing unit; and add to said output sequence an instruction for indicating that said repeated sub-sequence is not used anymore.

* * * * *